United States Patent [19]

Cheema et al.

[11] 4,079,633

[45] Mar. 21, 1978

[54] TRACTOR BELT

[75] Inventors: Sarabjit Singh Cheema, Westlake; Charles B. Small, Elyria, both of Ohio; Barton F. Norton, Columbia, Md.

[73] Assignee: Airborne Mfg. Co., Elyria, Ohio

[21] Appl. No.: 718,831

[22] Filed: Aug. 30, 1976

[51] Int. Cl.² ........................ F16H 7/00; F16G 1/28; G03B 1/30; G03B 1/24

[52] U.S. Cl. .................................. 74/229; 74/231 C; 226/74; 226/76

[58] Field of Search ...................... 24/229, 231 C, 221; 226/76, 79, 74

[56] References Cited

U.S. PATENT DOCUMENTS

| 3,014,627 | 12/1961 | Coonrod et al. | 226/74 |
| 3,507,431 | 4/1970 | Hepp et al. | 226/74 |
| 3,606,122 | 9/1971 | Brewster et al. | 226/74 |
| 3,765,582 | 10/1973 | Balint et al. | 226/76 X |
| 3,859,864 | 1/1975 | Offerman | 74/229 |
| 3,929,267 | 12/1975 | Foster | 226/74 |
| 3,949,573 | 4/1976 | Jacobsson | 226/74 X |
| 3,985,225 | 10/1976 | Baum et al. | 74/221 X |

Primary Examiner—Leonard H. Gerin

[57] ABSTRACT

A tractor belt adapted to be trained over and driven and supported by sprockets in a mechanism for advancing and positioning a strip of material having hole-in-line perforations, the belt comprising a wire-cored band having perforation engaging lugs integral with and projecting from one surface of the band and sprocket engaging lugs integral with and projecting from the opposite surface of the band. A method for making such a belt.

17 Claims, 15 Drawing Figures

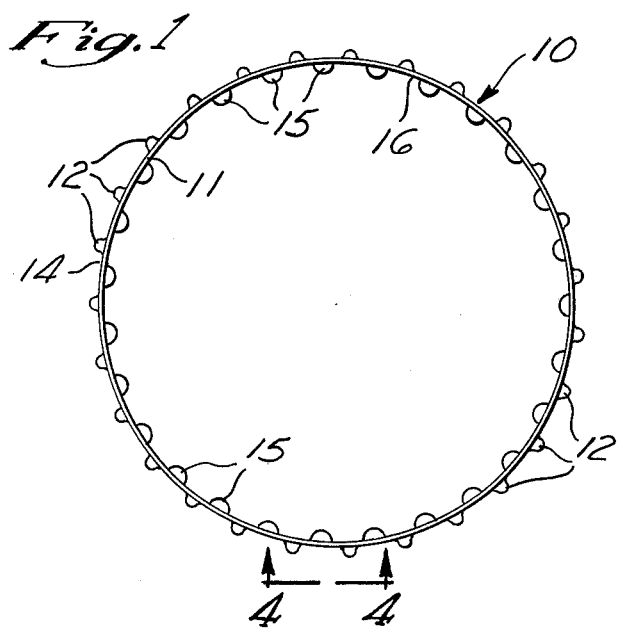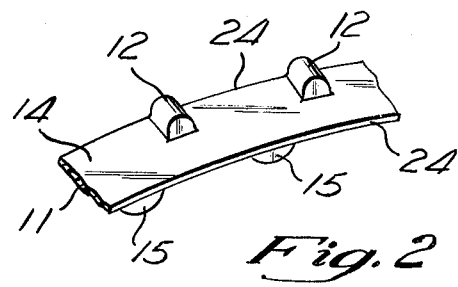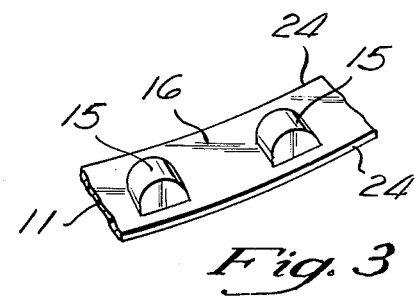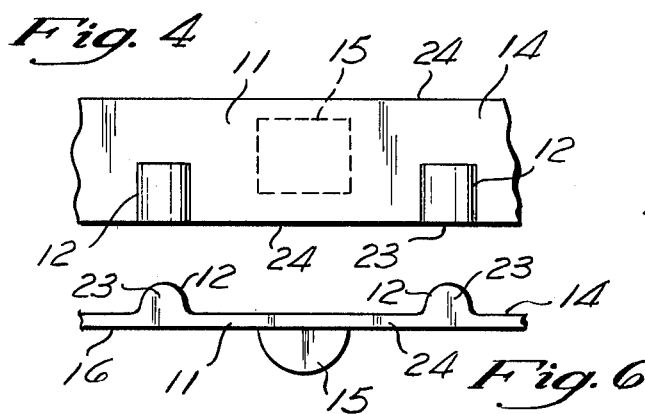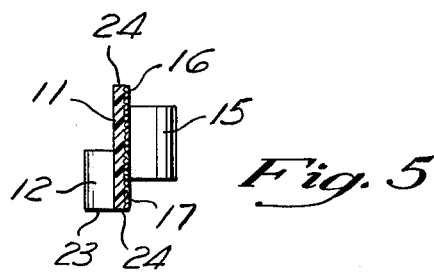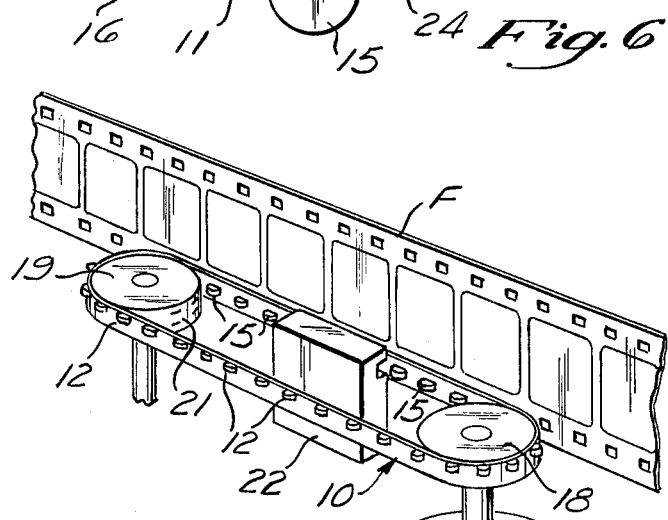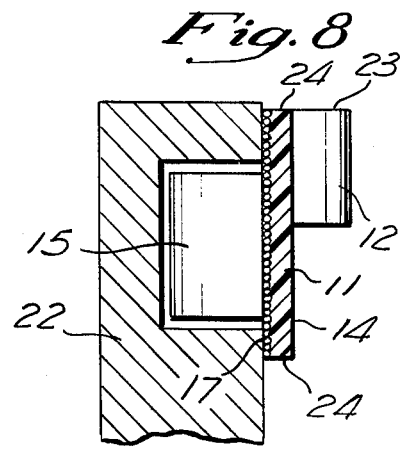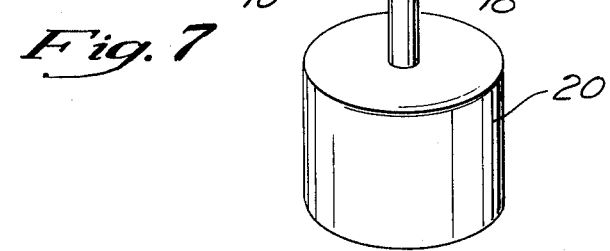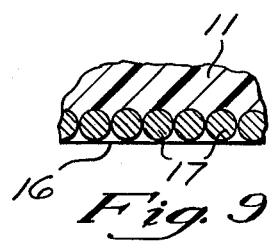

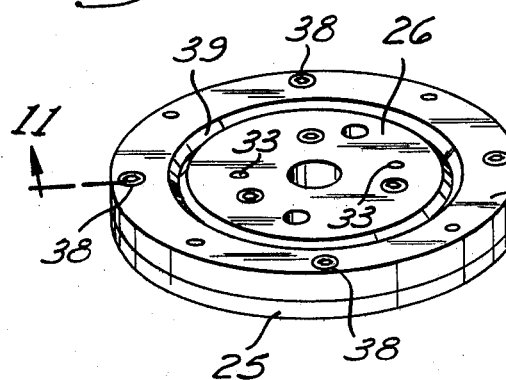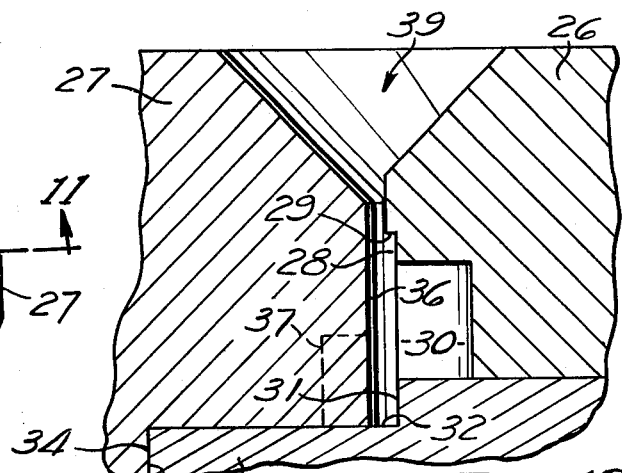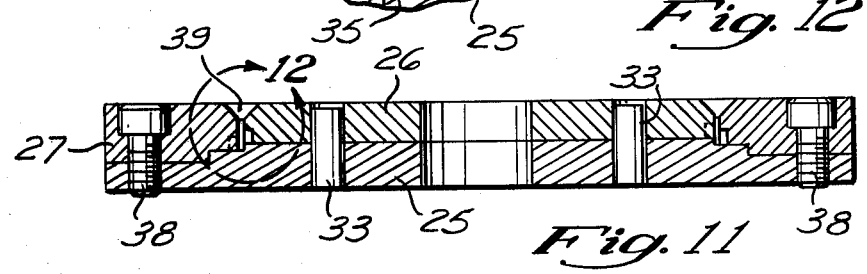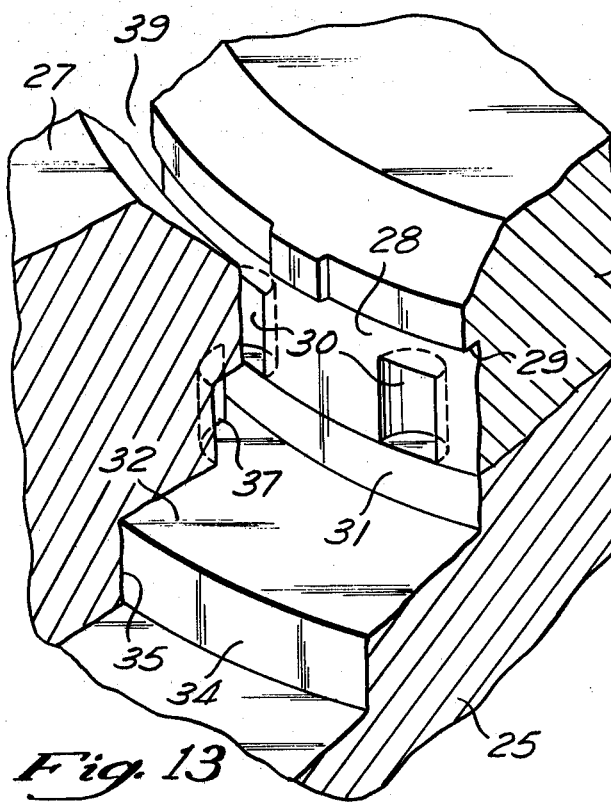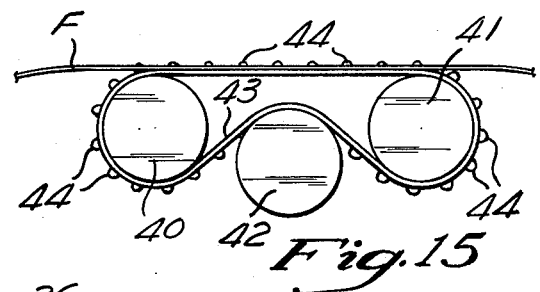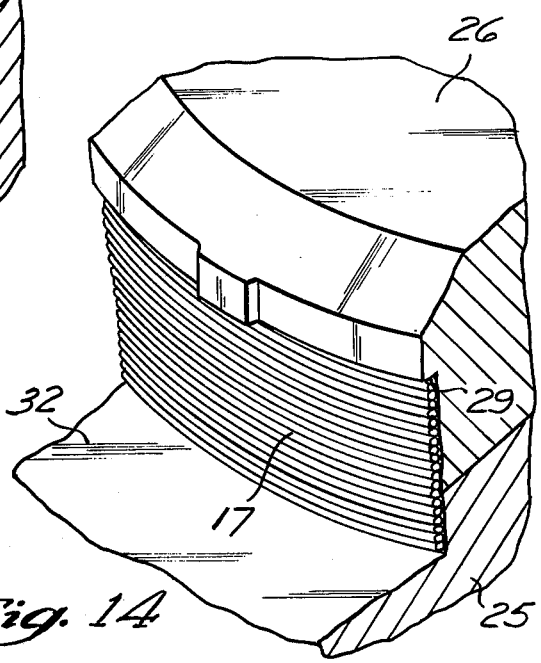

TRACTOR BELT

BACKGROUND OF THE INVENTION

This invention relates to means for advancing strip material in both directions along its length and particularly, strip material having holes or perforations spaced at intervals along its length, often in one or both margins of the material. Such means are utilized, for example, in machines for producing paper business forms and in the business machines such as high speed printers with which such forms are used. Motion picture cameras and projectors employ means of this kind in their film transport mechanisms.

An example of means of this kind is an endless mechanism including a toothed flexible belt trained on sprockets and carrying pins for engaging simultaneously a number of successive perforations in paper business forms. Such means are sometimes referred to as tractor mechanisms and such belts, as tractor belts. See, for example, U.S. Pat. No. 3,507,431.

This invention also includes a particular method for making the article embodying the invention.

Applications utilizing tractor mechanisms to advance and position continuous strip material typically involve stop and start motion and require exact control of the material being handled. Accurate positioning of successive segments or lines of the material at predetermined stations is necessary, for example, when moving paper business forms through high speed printers to insure correct placement of the printed material on the form. Even more critical is the positioning of each successive frame of a motion picture film in the projection aperature or gate. Failure to bring each frame to the same position results in undesirable "jump" of the projected image. In sophisticated applications such as scientific and medical projectors, projected images of successive frames of film on perceivably different spots on a viewing screen is unacceptable.

Other demands on tractor mechanisms and the like include the need to accelerate and decelerate the material at high rates when starting, moving, and stopping it to bring successive segments into registry with a predetermined station or position within a short interval of time. Simultaneous engagement of a number of perforations in the material being moved by pins or the like of the tractor mechanism is helpful in distributing the high inertia loads involved in providing such motions over a length of material and a number of perforations and thereby avoiding damage to the perforations in it. Mutilation and damage to the perforations is undesirable because it tends to prevent positive engagement of them by the tractor mechanism resulting in inaccurate control and movement of the material through its desired motion.

The foregoing problems involved in advancing perforated strip material dictate tractor mechanisms having pins or other means for engaging the perforations of the material that are accurately spaced at intervals corresponding closely to the spacing of the perforations, pins which fill the perforations without deleterious distortion of them to reduce play in their engagement with the pins, and pins which do not damage or degrade the perforations by wear and tear and which, in turn, are not themselves altered significantly by wear on the material being advanced.

Various endless belt, chain and band constructions have been utilized in the past. They have shortcomings of one type or another, however. Some fail to maintain a constant pitch diameter and resultant accurate pin spacing; others are difficult to fabricate consistently to the tolerances required for acceptable operation or are so expensive as to be impractical, and others are subject to inaccuracy through wear inherent in their construction materials.

SUMMARY OF THE INVENTION

This invention relates to an endless tractor belt for use in a tractor mechanism for advancing and positioning perforated strip material and subject to the requirements enumerated in the above discussion of the background of the invention. The belt of this invention, however, is an improvement over previously known similar means. It can be manufactured relatively easily with consistently high precision; i.e., accurate pitch diameter, pin size and pin spacing. It is designed to maintain its pitch diameter in spite of long operation trained over small radius sprockets and involving repeated stops and starts. The teeth or pin-like means for engaging the perforations in the material to be advanced are especially adapted to resist wear by motion picture safety film without deleterious distortion or damage to the perforations therein.

BRIEF DESCRIPTION OF THE DRAWINGS

FIG. 1 is a side elevational view of a tractor belt embodying a preferred form of this invention;

FIGS. 2 and 3 are enlarged perspective views of a portion of the belt in FIG. 1 showing particularly the radially outer and inner sides of the belt, respectively;

FIGS. 4, 5 and 6 are enlarged plan, sectional, and side elevation views, respectively, or a portion of the belt in FIG. 1;

FIG. 7 is a diagrammatic view in perspective of a tractor mechanism including a belt as shown in FIG. 1 trained around sprockets in driving engagement with a number of perforations in the margin of a strip of motion picture film;

FIG. 8 is a sectional view in enlarged scale of the belt, backing guide, and film shown in FIG. 7;

FIG. 9 is a sectional view of a portion of the belt as shown in FIGS. 5 and 8, for example, but in even greater enlargement; FIG. 10 is a perspective view of an assembled threepart mold used to make the belt of FIG. 1;

FIG. 11 is a sectional view on enlarged scale, through the assembled mold of FIG. 10 taken in the plane of 11-11;

FIG. 12 is a portion of the sectional view of FIG. 11 indicated in FIG. 11 by broken outline and shown on enlarged scale;

FIGS. 13 and 14 are two perspective views taken during practice of the method of this invention showing portions of elements of the mold of FIG. 10; and FIG. 15 is a plan view of an alternative tractor mechanism to that shown in FIG. 7 and including a modified form of this invention.

DETAILED DESCRIPTION OF A PREFERRED EMBODIMENT

A complete tractor belt 10 embodying this invention is shown in FIG. 1. Enlarged portions of belt 10 are shown in FIGS. 2 through 6 and 9. FIGS. 7 and 8 also show belt 10 or a portion thereof in connection with a tractor mechanism for transporting motion picture film. Belt 10 comprises an endless, flexible and generally flat thin band 11 having a set of strip engaging lugs 12 projecting from one surface 14 and another set of sprocket or cog engaging lugs 15 projecting from the opposite surface 16 of band 11. Embedded in band 11 and exposed at surface 16 are multiple turns of fine wire 17. (FIG. 9).

Belt 10 as shown and described is intended for use in a tractor mechanism of a motion picture projector (shown in part and diagrammatically in FIG. 7) for projecting coronary arteriography films, for example, at selected speeds from one to sixty frames per second in both directions and without any apparent motion from one projected image to the next except for that provided by the filmed subject. In other words, belt 10, when driven and controlled with the desired motions with respect to time and distance, must be able to continuously engage, advance, and release successive lengths of film in a way that accurately controls the film position at all times so that it faithfully imparts to the film only the motions desired.

A tractor mechanism for doing this is shown diagrammatically in FIG. 7 and comprises belt 10 trained about a drive sprocket 18 and an idler sprocket 19. Each is supported on a shaft for rotation. The shaft supporting drive sprocket 18 is driven by drive means 20. Lugs 15 engage cavities 21 provided in the peripheries of the sprockets at intervals corresponding to the spacing of lugs 15.

Along the straight line path of belt 10 between sprockets 18 and 19 side 16 of band 11 is guided and supported in the path of travel of film F by backing guide 22. This, with other film guides not shown, helps to guide the film through and correctly position it at the projection station of the projector where light is directed through one frame of the film at a time and into and through the projection lens.

Lugs 15 preferably correspond closely in size to or otherwise positively engage their mating sprocket cavities 21. Also, as noted above the spacing of lugs 15 matches the spacing of sprocket cavities 21 driving and supporting the belt. Similarly, lugs 12 must be spaced on the belt at intervals corresponding closely to the spacing of the perforations in the film to be transported. In addition, each lug 12 must be large enough to fill a perforation in the film so that the engagement is positive and admits of no lost motion; at the same time, primarily by their shape, lugs 12 must be capable of free and smooth entry and withdrawal from the film perforations.

The belt of this invention fulfills these requirements by means of spaced apart lugs, supported, projecting from and integral with an endless band. As shown in the drawings, lugs 12 are approximately semi-cylindrical and oriented with their flat ends 23 parallel to side edges 24 of band 11 and belt 10, and therefore also parallel to the direction of travel of the belt and film carried by it. The cross sectional dimension of each lug 12 in the direction of travel and at surface 14 of band 11 from which it projects matches the corresponding dimension of the perforations it is to engage so that when a lug has fully entered a perforation the lug completely fills the opening in at least the direction of path of travel and the belt and film move together as one.

Lugs 12 are preferably located with one end 23 flush with an edge 24 of the belt as seen clearly in FIGS. 4 and 5 to keep the band away from interference with the image area of the film. They may be spaced to engage every perforation in the film to be transported, or to engage less than every one. There must be simultaneous engagement between a plurality of lugs 12 and perforations of the transported film to achieve the full benefits of this invention including distribution of the inertia loads and minimization if not elimination of an accumulation of spacing error encountered when engagement is only by successive single lugs or pins of conventional pin sprockets or claw mechanisms.

Lugs 15 as shown are also approximately semi-cylindrical, flat ended, and sized to fill a corresponding cavity in sprocket drive and idler wheels. It will be noted that each lug 15 is shorter than the width of band 11 and is located on the width away from both edges 24. The reason for this is discussed below.

Lugs 12 and 15 as well as band 11 formed integrally with them are preferably molded of a plastic material having good elasticity, flexibility and a high resistance to cutting, tearing and abrasion. These properties insure a "handling" of the film or other strip material to be advanced by the belt of lugs that will not cause undesirable damage or distortion of the perforations. This advantage is not possible with metal perforation-engaging pins or lugs, for example. The elastic yielding quality of the material aids in filling each perforation with the lug engaging it, while minimizing wear and alteration of the lug size and shape by strip material having sharp, hard edges such as motion picture film.

In a belt comprising a preferred embodiment of this invention, the band 11 and integrally formed lugs 12 and 15 are molded as described below of urethane polymer such as Adiprene 100 and a curing agent such as Moca, both by E. I. duPont de Nemours & Co., Inc.

The multiple turns of fine wire 17 are embedded in band 10 to provide the tensile strength necessary to an endless belt of fixed predetermined length and having lugs 12 for example, held to their originally established pitch. The wire is preferably fine and of a diameter only a fraction of the thickness of band 11. In a preferred embodiment, 5 mil diameter, tempered, stainless steel wire is used in a band between about 0.020 - 0.040 inch thick and 0.160 inch wide; the thinner belt being as preferred as the thicker when the rate of projection of film approaches or gets as high as 60 frames per second and starting and stopping the film, tractor belt and idler pulleys requires acceleration as high as about 126 g's. Such a fine wire provides the requisite tensile strength and resultant dimensional stability and permits sufficient flexibility to allow many passes around small diameter sprockets without fatigue failure.

A single length of wire 17 is preferred, wound in multiple turns in a single layer from edge to edge of band 11. Adjacent turns are advantageously spaced from each other to insure being completely embedded in the band material as shown especially in FIG. 9. It is also clear in FIG. 8 showing a section through backing guide 22 that the wires 17 are embedded in band 11 close to surface 16 so that the outside diameter of each wire 17 is at least tangent with and exposed on surface 16. This feature of the invention provides a low friction hard wear surface for sliding engagement with backing guide 22. Backing guide 22, of course, is provided with a groove to permit the free passage of driving lugs 15 as shown.

Thus high tensile strength fine wire 17 cooperates in an advantageous and unexpected way with and to overcome the shortcoming and preserve the advantages of band 11 and its integral lugs 12 and 15 by insuring a belt of fixed pitch length having a wear resistant surface in the desired place to fulfill the objects of the tractor mechanism.

It should be noted that lugs 12 and 15 may be located along the length of band 11 in a staggered fashion as shown in the drawings or they may be positioned opposite each other or be unequal in number without losing advantages of this invention. Also, other lug shapes than the approximately semi-cylindrical ones shown may be used so long as they permit clean and easy entry and withdrawal from the cavities and perforations they are intended to engage and fill or otherwise positively engage them for accurate control and positioning of the transported strip material.

This invention also comprehends a method for making the belt described above. The general process involved is molding. The belt, according to the method is molded in a circle in a three part mold, the parts of which are shown assembled in FIGS. 10 and 11.

The mold comprises a two part central mandrel element consisting of base 25 and inner ring 26 and an outside element consisting of outer ring 27. Inner ring 26 has a cylindrical shoulder 28 corresponding to and for providing surface 16 of band 11. Shoulder 28 extends between one face of inner ring 26 and annular surface 29 which corresponds to and defines an edge 24 of band 11. Pockets 30 are provided in the bottom of shoulder 28 corresponding to and for forming lugs 15.

Base 25 has a cylindrical shoulder 31 reaching to its upper face that is narrower in axial extent but corresponds to and matches in diameter cylindrical shoulder 28 in inner ring 26. Annular surface 32 meets shoulder 31 and corresponds to and defines the other edge 24 of band 11.

Base 25 is provided with dowel pins 33 so base 25 and inner ring 26 may be put together in a fixed relationship with shoulders 28 and 31 aligned and a single cylindrical surface formed corresponding to the full width of band 11 with pockets 30 spaced between surfaces 29 and 32. This relationship is shown clearly in FIG. 12, an enlargement of that portion of the assembled mold described above and shown, for example, in FIG. 11.

Outer ring 27 is an annular element that surrounds the central mandrel element made up of base 25 and inner ring 26, resting on annular surface 32 of base 25. When inner ring 26 is in place on base 25 located coaxially with the central mandrel by engagement of interfitting cylindrical shoulders 34 and 35 on base 25 and outer ring 27, respectively, inner cylindrical shoulder 36 of ring 27 corresponding to and providing surface 14 of band 11 is opposite, but spaced radially from shoulders 28 and 31 a distance equal to the desired thickness of band 11. Inner cylindrical shoulder 36 is provided with open-ended pockets 37 corresponding to and for forming lugs 12 integrally with band 11.

Machine screws 38 hold outer ring 27 in place on base 25. The upper and radially adjacent corners of ring elements 26 and 27 are chamfered or otherwise relieved to make a V-shaped annular trough 39 opening into the mold cavity formed between the central and outer elements of the mold.

In practicing the method of this invention using the apparatus described above, base and inner ring mold parts 25 and 26 are assembled together as shown in the drawings. Fine wire 17 is wrapped in successive turns preferably spaced a distance less than the wire's diameter apart and in a single layer extending between surfaces 29 and 32 of shoulders 28 and 31, respectively. One end of wire 17 may be held for winding by inserting it into a passage (not shown) in surface 29 or 32, for example. Slight tension on the wire of from ¼ to ½ pound is preferred during the winding operation. When wound the other end of the wire may be inserted in another opening (not shown) in the other annular surface to hold the wrapped wire in place. The wire preferably is coated with a priming agent such as Ecco prime PR-1 to increase the adhesion of the urethane polymer to it.

Next, outer ring 27 is located in its assembled position enclosing and coaxial with the central mandrel portion and fastened in place with machine screws 38. The mold elements will then be related as shown variously in FIGS. 11, 12 and 13 and with wire 17 in place as shown in FIG. 14.

The preferred method of filling the mold cavity comprises placing the entire mold assembled as described above and with the multiple turns of wire in place in an evacuated chamber and then pouring the material to be molded into trough 39. The material flows from all around the trough into the mold cavity through the opening between inner ring 26 and outer ring 27. Because the mold is evacuated no air need be displaced from the cavity by the material flowing into it.

It is also possible and some useful belts have been made by filling trough 39 of the assembled mold in a normal atmosphere and then drawing a vacuum on the mold cavity once it is essentially filled.

A particular modified form of tractor belt embodying this invention is shown in FIG. 15. The tractor mechanism shown includes a pair of idler sprockets 40 and 41 and a drive sprocket 42. A tractor belt 43 is trained over and around the sprockets so that lugs 44 thereon which engage perforations in film F also engage cavities or pockets in drive sprocket 42. Thus, the lugs that engage the perforations and control the motion of film F also provide a driving connection between belt 43 and its driving means, drive sprocket 42.

This form of the invention enjoys all the advantages described above as well as the additional advantage of not involving the problem of spacing relationships between the lugs on one side of the belt and those on the other side of the belt.

Other obvious modifications of the preferred and modified forms of the invention described above include the reversal or exchange of drive lugs 15 of belt 10 with pockets or openings on a drive sprocket. Lugs 15 of the same character and quality as described above could be provided on the outer periphery of a drive sprocket such as sprocket 18 in the mechanism of FIG. 7 for engagement with pockets or openings in belt 10 similarly related and corresponding to pockets or cavities 21 in sprockets 18 and 19.

In this form of the invention, the arrangement and location of the wire core in the belt could include a space between adjacent strands to accommodate the openings. Also the core comprised of multiple strands of fine wire embedded in band 10 in the preferred embodiment described above could be formed of a steel band end welded and perforated to provide the necessary openings therein.

Also the spacing and location of lugs 12 and 15 laterally and longitudinally on each side of band 10 of belt 11 and relative to each other may be varied for varying the distribution of the loads applied to band 10 by the lugs without losing the advantages and benefits of the invention. This invention as disclosed and claimed here comprehends, for example, belts having two or more parallel sets of lugs for engaging and transporting perforated strip material.

Other modifications and alterations of the preferred embodiments will occur to others upon a reading and understanding of the specification and it is intended to include all such modifications and alternations as part of this invention insofar as they come within the scope of the appended claims.

We claim:

1. An endless tractor belt for advancing perforate strip material, which strip material has longitudinally spaced and aligned perforations, said belt comprising an endless, thin, flexible, plastic bend engageable with material and an endless, flexible, high-tensile-strength, multiple-strand, filament reinforcement molded in and bonded to said band on and substantially throughout one side of said belt, said belt also having integrally molded lugs on said one side integrated with said band through said wire reinforcement, and being bonded to said reinforcement, for part of the width of said belt, said belt being adapted to be driven through and by engagement with said lugs on said one side.

2. The belt of claim 1 in which each strand of said filament is fine with its diameter not more than 0.005 inch nor more than about one-eight to one-quarter the thickness of said band.

3. The belt of claim 2 wherein said reinforced belt is flexible in bending and substantially inextensible longitudinally under the loads to which it is subjected.

4. The belt of claim 1 wherein said reinforcement comprises multiple adjacent turns of said wire having exposed surfaces with a low coefficient of sliding friction.

5. The belt of claim 4 wherein parts of said turns of said wire are exposed externally on the surface of the reinforced side of said belt for at least another part of the said width of said belt.

6. The belt of claim 5 in which said turns lie closely adjacent each other and one layer in depth.

7. The belt of claim 6 in which said reinforcement comprises continuous helical turns of said wire, bonded throughout its length in and to the belt.

8. The belt of claim 5, wherein said another part comprises portions adjacent each edge of the belt.

9. The belt of claim 1 with integrally molded lugs on the other side of the belt which elastically yield to engage perforations in said strip material fully.

10. The belt of claim 9 wherein said lugs lie adjacent one edge of the belt and the ends of said lugs are flush with said edge.

11. The belt of claim 10 in which said band and lugs are molded of urethane polymer and said wire is high-tensile stainless steel drawn down to no more than about 0.005 inch in diameter.

12. An endless tractor belt for advancing perforate strip material, which strip material has longitudinally spaced and aligned perforations, said belt comprising an endless, thin, flexible, plastic band and an endless, flexible, high-tensile-strength, multiple-strand, fine wire reinforcement molded and bonded in said band on and substantially throughout one side of said belt, said belt also having lugs on said one side which are integrated with said band through said fine wire reinforcement, and are bonded to said reinforcement for at least part of the width of said belt, said belt being adapted to be driven through and by engagement with said lugs, and said lugs also being releasably and drivably engagable with said perforations in said strip.

13. The belt of claim 12 in which said belt is flexible in bending, substantially stretch-proof under the loads to which it is adapted to be used and said wire reinforcement is wound helically and molded into said band in its helical form.

14. A tractor belt intended to be trained over sprockets of a tractor mechanism for advancing motion picture film having at least one line of perforations spaced at intervals along its length, said belt comprising an endless flexible, flat, band molded of plastic material having substantial elasticity and high resistance to cutting, tearing and abrasion and having molded integral therewith a first set of lugs adapted to fill without deleterious deformation the perforations in the film to be advanced and to be highly resistant to wear by repeated engagement and disengagement with the abrasive and sharp film material, said lugs each projecting from one surface of said belt and distributed at predetermined intervals along its length corresponding to the spacing of and for simultaneous engagement with a plurality of the perforations in the film to be advanced by said belt in the tractor mechanism and a second set of lugs each projecting from the opposite surface of said belt distributed at predetermined intervals along its length for engagement with sprockets in the tractor mechanism, and multiple turns of fine high tensile strength wire wound in a single layer across the width of said band and imbedded in said band of material adjacent to and exposed on said opposite surface and supporting and carrying said plastic material and lugs molded integrally therewith repeatedly over and around the sprockets in the tractor mechanism while maintaining substantially constant the spacing between said lugs and the length of said belt.

15. The method of making an endless flexible, stretch-proof, substantially inextensible tractor belt having protruding lugs on at least one side, all made of thin stretchable molded plastic material, into said one side of which a flexible reinforcement of multiple turns of fine, high-tensile-strength wire is molded and bonded, comprising firstly, providing an inner mold member having an external, smooth, cylindrical surface and an outer mold member having an internal, smooth, cylindrical surface complementary to said external surface and adapted to be uniformly spaced the thickness of said belt therefrom, at least one of said surfaces having lug-forming cavities depressed therein and both said surfaces having like axial length equal to the width of the belt, secondly, wrapping said external surface with a layer of multiple turns of said fine wire under appreciable tension and in uniformly close contact with said surface and securing the ends thereof temporarily, thirdly, placing said mold members in juxtaposition with said surfaces coaxial and forming an annular cavity having the width and thickness of said belt, and fourthly, filling said cavities forcibly with fluid plastic material and bonding said reinforcing wire into the inner side of the belt, and lastly, removing the reinforced belt from the mold after the plastic material has been cured.

16. The method of claim 15 with the step of spacing adjacent turns of wire from each other to permit bonding said plastic material to the whole exterior surface of the wrapped wire which is not in contact with the said cylindrical surface of said mold member.

17. The method of claim 16 with the step of filling lug cavities in said external cylindrical surface with plastic material flowing between said turns from said annular cavity.

* * * * *